United States Patent
Bock

(10) Patent No.: US 7,525,587 B2
(45) Date of Patent: Apr. 28, 2009

(54) IMAGE SENSORS WITH PIXEL RESET

(75) Inventor: Nikolai E. Bock, Pasadena, CA (US)

(73) Assignee: Aptina Imaging Corporation, Grand Cayman (KY)

(*) Notice: Subject to any disclaimer, the term of this patent is extended or adjusted under 35 U.S.C. 154(b) by 458 days.

(21) Appl. No.: 11/473,312

(22) Filed: Jun. 23, 2006

(65) Prior Publication Data

US 2006/0285001 A1    Dec. 21, 2006

Related U.S. Application Data

(63) Continuation of application No. 09/858,748, filed on May 16, 2001, now Pat. No. 7,274,396.

(60) Provisional application No. 60/204,372, filed on May 16, 2000.

(51) Int. Cl.
*H04N 3/14* (2006.01)
(52) U.S. Cl. .................... 348/308; 348/311; 250/208.1
(58) Field of Classification Search ................ 348/294, 348/302, 308, 309, 311, 322, 323; 250/208.1
See application file for complete search history.

(56) References Cited

U.S. PATENT DOCUMENTS

| 5,471,515 | A  | 11/1995 | Fossum et al. |
| 5,831,676 | A  | 11/1998 | Ueno |
| 5,898,168 | A  | 4/1999  | Gowda et al. |
| 5,920,345 | A  | 7/1999  | Sauer |
| 6,175,383 | B1 | 1/2001  | Yadid-Pecht et al. |
| 6,218,656 | B1 | 4/2001  | Guidash |
| 6,222,175 | B1 | 4/2001  | Krymski |
| 6,519,371 | B1 | 2/2003  | Pain et al. |

OTHER PUBLICATIONS

N.E. Bock, "Reset Noise at Low Temperatures", Journal De Physique IV, Colloque 3, supplement au Journal de Physique III, vol. 6, Apr. 1966, pp. C3-207-C3-211.
Pain et al., "Analysis and enhancement of low-light level performance of photodiode-type CMOS active pixel imagers operated with sub-threshold reset", 1999 IEEE Workshop on CCDs and Advanced Image Sensors, pp. 140-143.

*Primary Examiner*—Lin Ye
*Assistant Examiner*—Gevell Selby
(74) *Attorney, Agent, or Firm*—Dickstein Shapiro LLP

(57) ABSTRACT

Techniques for use with image sensors include transferring a signal level from an active sensor pixel to a readout circuit, performing a flushed reset of the pixel, and isolating the pixel from the readout circuit during resetting of the pixel.

16 Claims, 4 Drawing Sheets

IMAGE SENSORS WITH PIXEL RESET

RELATED APPLICATIONS

This application is a continuation of application Ser. No. 09/858,748, filed on May 16, 2001 now U.S. Pat. No. 7,274,396, which claims the benefit of priority of U.S. Provisional Patent Application Ser. No. 60/204,372, filed on May 16, 2000, which are hereby incorporated by reference in their entireties.

BACKGROUND

The invention relates, in general, to image sensors with pixel reset.

Image sensors find applications in a wide variety of fields, including machine vision, robotics, guidance and navigation, automotive applications, and consumer products. In many smart image sensors, it is desirable to integrate on-chip circuitry to control the image sensor and to perform signal and image processing on the output image.

Active pixel sensors (APS), which have one or more active transistors within the pixel unit cell, can be made compatible with complementary metal-oxide-semiconductor (CMOS) technologies and promise high readout rates compared to passive pixel sensors. Active pixel sensors often are arranged as arrays of elements, which can be read out, for example, a column at a time. Each column can be read out at one time, driven and buffered for sensing by a readout circuit.

A dominant source of noise for some sensors is thermal noise in the channel of the pixel's reset transistor. Such thermal noise is often referred to as kTC noise. Noise less than kTC noise can be achieved with photodiode-type pixels using soft-reset techniques. Soft, or sub-threshold, reset refers to resetting the pixel with both the drain and gate of the reset transistor maintained at substantially the same potential so that the sense node is reset using sub-threshold MOSFET current. Sub-threshold resetting of photodiode active pixel sensors, however, tends to result in higher image lag and low-light level non-linearity.

SUMMARY

A technique for use with image sensors include transferring a signal level from an active sensor pixel to a readout circuit, performing a flushed reset of the pixel, and isolating the pixel from the readout circuit during resetting of the pixel. In some implementations, the technique includes preventing a parasitic output capacitance from discharging through a load transistor in the readout circuit during the reset operation.

An integrated circuit chip is disclosed that includes an array of active sensor pixels, readout circuits and a controller for providing control signals. The integrated circuit chip can provide flushed reset of pixels in a selected row and can isolate pixels in the selected row from the associated readout circuits during resetting of the pixels. In some implementations, the integrated circuit chip can prevent a parasitic output capacitance from discharging through load transistors in the readout circuits during resetting of the pixels.

The controller can be configured for providing a first control signal to enable row selection switches in a selected row of pixels to transfer signal levels from the pixels in the selected row to the associated readout circuits, for subsequently providing a second control signal to enable reset switches in the selected row of pixels, and for causing the first control signal to disable the row selection switches in the selected row of pixels during resetting of the pixels in the selected row. Disabling the row selection switches during the reset operation isolates the pixels in the selected row from their readout circuits.

Isolating the pixels in the selected row from the associated readout circuits during resetting and preventing discharge of the output capacitance during the reset operation can help reduce or eliminate secondary image lag and non-linearity, in addition to the reduction in lag and non-linearity that may be provided by the flushed reset operation.

Other features and advantages will be readily apparent from the detailed description, the accompanying drawings and the claims.

DETAILED DESCRIPTION

Figure 1:
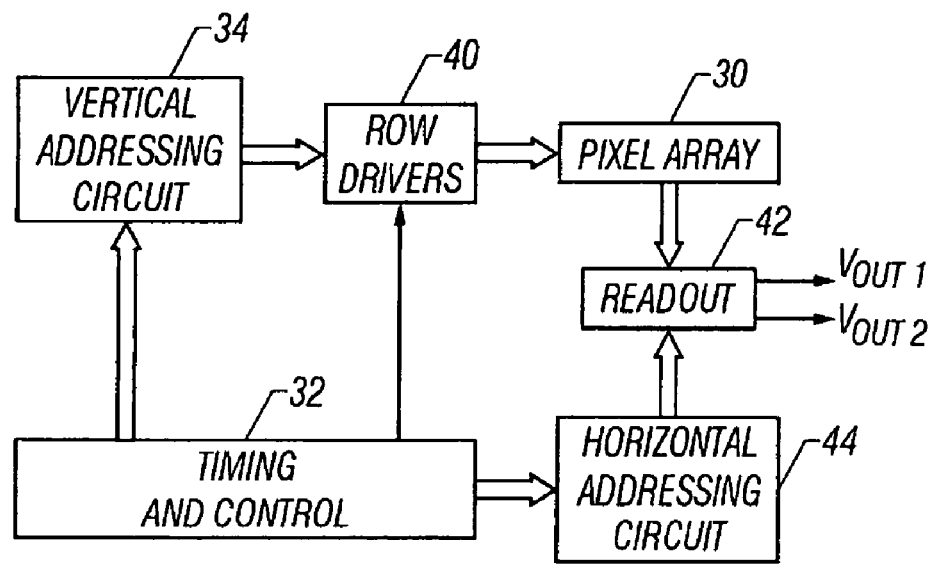
FIG. 1 is a block diagram of a CMOS active pixel sensor chip.

As shown in FIG. 1, an imaging device formed as a monolithic CMOS integrated circuit includes an array of active pixel sensors 30 and a controller 32 that provides timing and control signals to enable reading out of signals stored in the pixels. The array 30 may have dimensions, for example, of 128 by 128 pixels or 256 by 256 pixels, although, in general, the size of the array will depend on the particular implementation.

The imager can be read out a row at a time using a column parallel readout architecture. The controller 32 selects a particular row of pixels in the array 30 by controlling the operation of a vertical addressing circuit 34 and row drivers 40. Charge signals stored in the selected row of pixels are provided to a readout circuit 42. The pixels read from each of the columns then can be read out sequentially using a horizontal addressing circuit 44. Differential pixel signals (VOUT1, VOUT2) can be provided at the output of the readout circuit 42.

Figure 2:
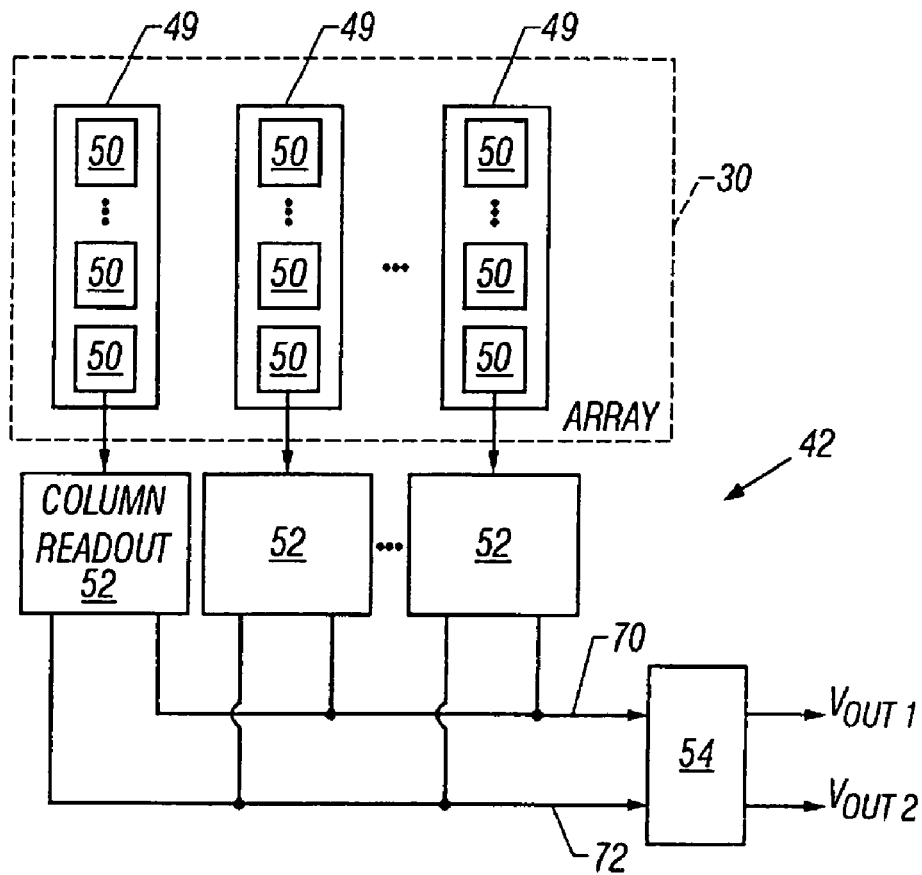
FIG. 2 is a block diagram of an array of active pixel sensors and corresponding readout circuitry.

As shown in FIG. 2, the array 30 includes multiple columns 49 of CMOS active pixel sensors 50. Each column includes multiple rows of sensors 50. Signals from the active pixel sensors 50 in a particular column can be read out to a readout circuit 52 associated with that column. Signals stored in the readout circuits 52 then can be transferred to an output stage 54 which may be common to the entire array of pixels 30. The analog output signals then are sent, for example, to a differential analog-to-digital converter (ADC).

Figure 3:
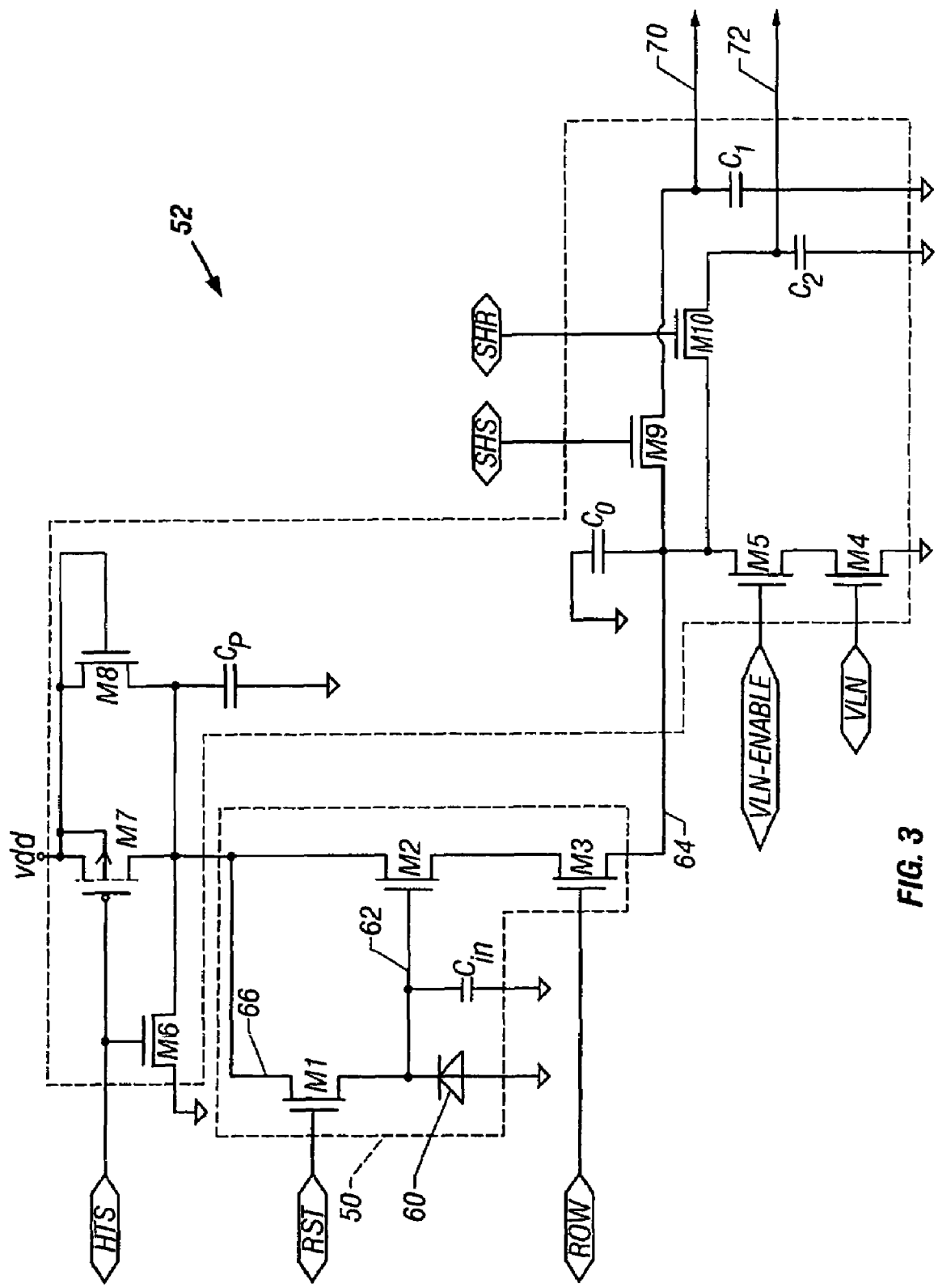
FIG. 3 illustrates details of an active pixel sensor and a column readout circuit.

As illustrated in FIG. 3, each CMOS active pixel sensor 50 includes a photo-sensitive element such as a photodiode 60 buffered by a source-follower n-channel MOS transistor M2. The pixel has an integration capacitance $C_{in}$ and includes a reset switch that can be implemented as an n-channel MOS transistor M1 controlled by a signal (RST) applied to its gate. The integration capacitance $C_{in}$ periodically is charged by current from the photodiode 60 and is reset by turning on and off the reset transistor M1. A voltage on the charge-detection (or sense) node 62 is transferred through the source-follower transistor M2 to the readout circuit 52 by enabling a row selection switch M3. The row selection switch can be implemented as an n-channel MOS transistor that is enabled by applying a high signal (ROW) to its gate. The reset and row enable signals (RST, ROW) are common to a row of pixels in the array 30 and are generated by the controller 32.

Each column readout circuit 52 includes an n-channel load transistor M4 for the source-follower transistors M2 of each pixel in the associated column 49. The load transistor is controlled by a signal (VLN) applied, to its gate. Another n-channel transistor M5 is connected between the column readout bus 64 and the load transistor M4. A control signal (VLN_ENABLE) is applied to the gate of the transistor M5. When the transistor M5 is disabled, it decouples the load transistor M4 from the rest of the readout circuit 52. The signals VLN and VLN_ENABLE are generated by the controller 32.

Figure 4:
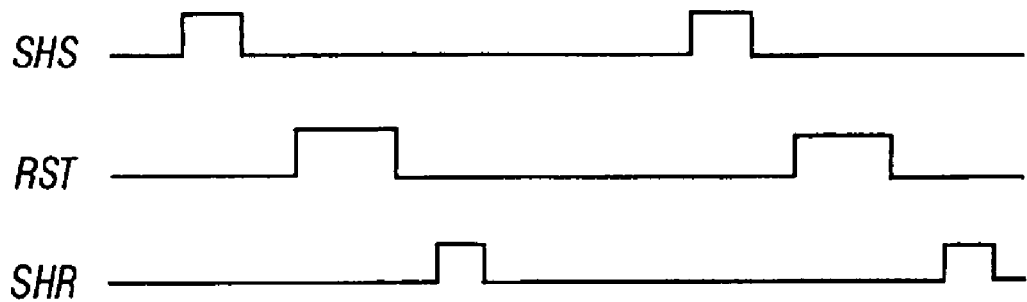
FIG. 4 is a timing diagram associated with FIG. 3

In the illustrated implementation, the readout circuit 52 includes two sample-and-hold switches, implemented as n-channel MOS transistors M9, M10. When the row selection switch M3 is enabled, the transistor M9 also is enabled by a high signal (SHS) applied to its gate to allow the selected pixel's signal level to be stored on the capacitor $C_1$. As indicated by FIG. 4, the pixel then is reset. The transistor M10 subsequently is enabled by a high signal (SHR) applied to its gate to allow the selected pixel's reset, level to be stored on the capacitor $C_2$. The sample and hold signals (SHS, SHR) are generated by the controller 32 and are common to a row of pixels. Sampling both the reset and signal levels allows correlated double sampling (CDS) to be performed.

The readout circuit 52 also includes additional circuitry that allows the pixel to be flushed during the reset phase. The additional circuitry includes n-channel MOS transistors M6, M8 as well as p-channel MOS transistor M7. That circuitry controls the potential at the drain 66 of the reset transistor M1. The power supply voltage ($V_{dd}$) is routed to the column of pixels through the p-channel transistor M7 and the n-channel transistor M8 which limits the supply voltage excursion. A signal (HTS), generated by the controller 32, is applied to the gates of the transistors M6, M7.

Figure 5:
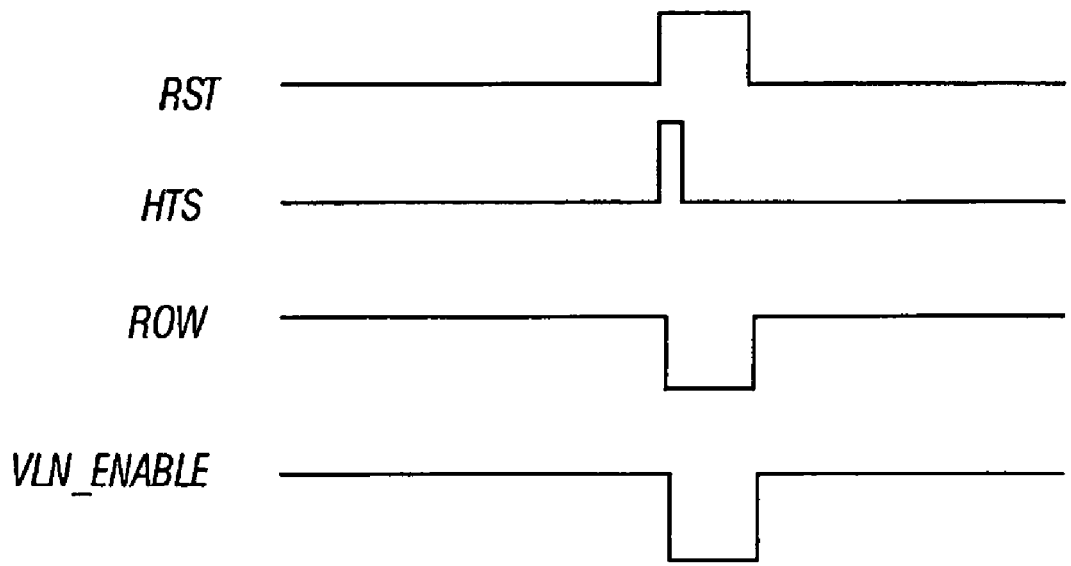
FIG. 5 is another timing diagram associated with FIG. 3.

When the pixel is reset, the signal HTS is momentarily pulsed ON (see FIG. 5). That causes the pixel to reset initially in hard reset, followed by soft reset. The parasitic power supply capacitance $C_P$ discharges through the transistor M6 when the signal HTS is pulsed. Thus, the hard reset erases the pixel memory so that the soft reset level reaches substantially the same level regardless of the strength of the optical signal on the photodiode 60.

Figure 6:
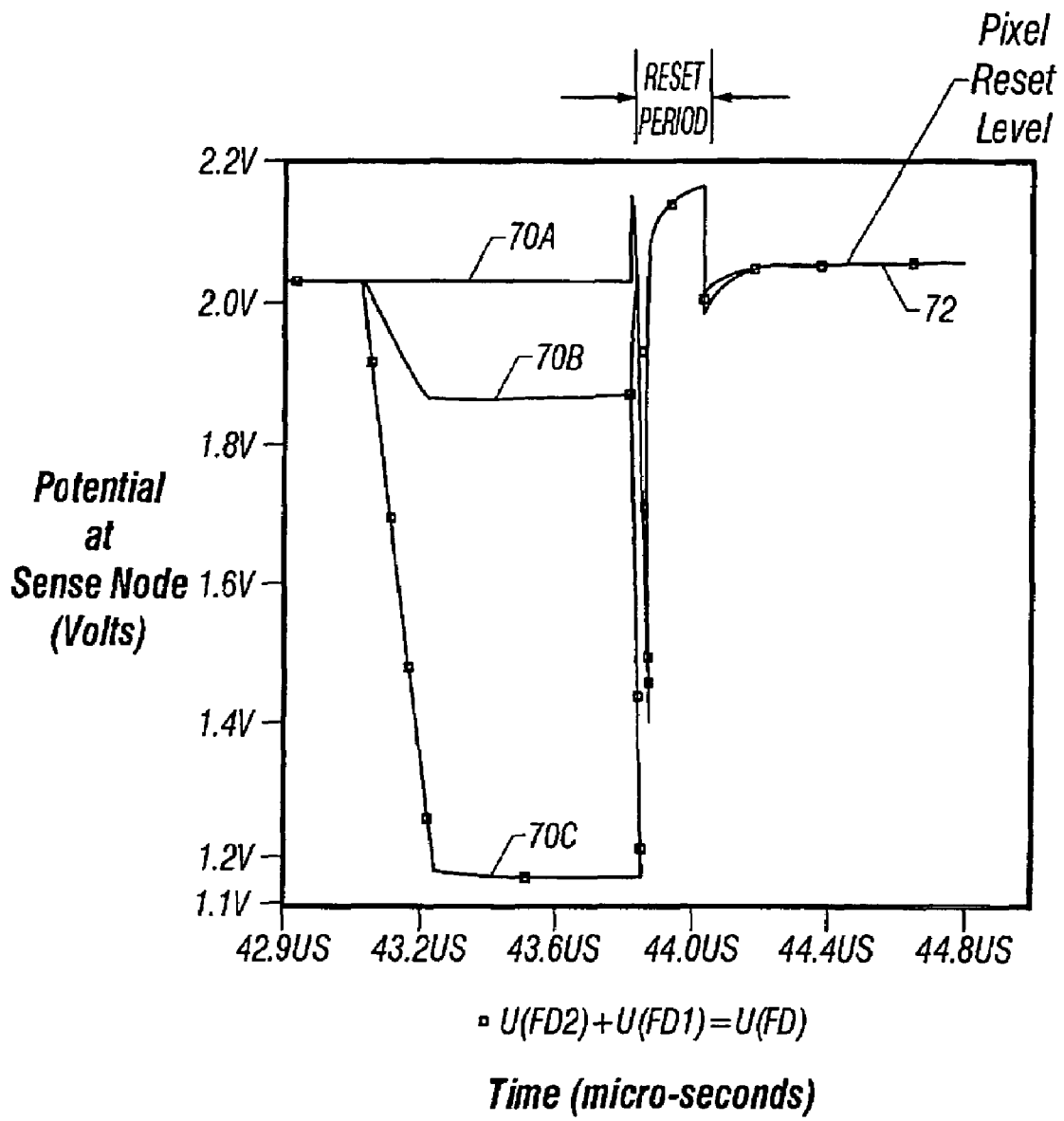
FIG. 6 illustrates results of simulated testing.

To help reduce or eliminate the signal-dependent transient current during the reset phase, the pixel output is isolated from the readout circuit 52 by disabling the row selection switch M3 during the reset operation (see FIG. 5). Disabling the row selection switch M3 prevents charge that may be stored on the parasitic output capacitance $C_O$ from influencing the equivalent pixel capacitance $C_{in}$. Results from SPICE simulations (FIG. 6) indicate that the dependency of the pixel's reset level on the signal level can be reduced significantly or eliminated. Even when the simulated pixel signal level was varied among different values 70A, 70B, 70C, the simulated pixel reset level was substantially the same.

As also shown in FIG. 5, the transistor M5 can be disabled during the reset operation to prevent the parasitic output capacitance $C_O$ from discharging through the load transistor M4. By preventing discharge of the parasitic output capacitance through the load transistor M4, the need to recharge the capacitance $C_O$ after the reset operation can be avoided. That can improve the overall operating speed of the imager and reduce overall power consumption.

In general, the dimensions of the transistors will depend on the particular application. However, examples of transistor dimensions are provided in the following chart:

| Transistor | Width (microns) | Length (microns) |
|---|---|---|
| M1 | 1.1 | 0.55 |
| M2 | 1.5 | 0.7 |
| M3 | 1.5 | 0.5 |
| M4 | 3.6 | 1.2 |
| M5 | 6 | 0.5 |
| M6 | 1.2 | 0.5 |
| M7 | 4 | 0.5 |
| M8 | 1.2 | 0.5 |

Different dimensions may be suitable for other implementations.

The foregoing technique can take advantage of flushed reset, also can reduce or eliminate the transient current through the active pixel transistors during the flush phase. Therefore, secondary image lag and non-linearity can be reduced, in addition to the reduction in lag and non-linearity that may be provided by flushed reset.

Other implementations are within the scope of the claims.

What is claimed:

1. A method of operating an imager pixel, the method comprising:
    transferring a first voltage from the pixel to the readout circuit, the first voltage representing an amount of light impinging on the pixel during an integration period;
    electrically disconnecting the pixel from the readout circuit;
    performing a hard reset of the pixel;
    performing a soft reset of the pixel;
    electrically connecting the pixel to the readout circuit; and
    transferring a second voltage from the pixel to the readout circuit, the second voltage representing a soft reset level for the pixel.

2. The method of claim 1, wherein the soft reset level is substantially the same as additional soft reset levels of the pixel regardless of the amount of light impinging on the pixel.

3. The method of claim 1, further comprising preventing a parasitic output capacitance from discharging through a load transistor of the readout circuit during the hard and soft resets.

4. The method of claim 1, wherein electrically disconnecting the pixel comprises disabling a row select transistor before the hard reset.

5. The method of claim 4, wherein electrically connecting the pixel comprises enabling the row select transistor after the soft reset.

6. The method of claim 1, wherein performing the hard reset comprises discharging a power supply capacitance present at a node coupled to a drain of a pixel reset transistor.

7. The method of claim 6, wherein performing the soft reset comprises connecting the power supply to the node coupled to the drain of the pixel reset transistor.

8. An imager device comprising:
    a pixel comprising a photosensitive element, a reset switch, storage node and a row select switch;
    a first circuit connected to a first source/drain terminal of the reset switch, the first circuit adapted to apply a hard reset voltage level to the first source/drain terminal when a first control signal is applied and adapted to provide a power supply level to the first source/drain terminal when the first control signal is not applied;

a readout circuit connected to a source/drain terminal of the row select switch by an output line, the readout circuit comprising a load transistor adapted to bias the output line and an enabling switch coupled between the output line and the load transistor; and a controller connected to the pixel and the readout circuit, the controller adapted to provide a row select control signal to enable the row select switch to transfer an image voltage level from the pixel to the readout circuit, the image voltage level representing an amount of light impinging on the pixel during an integration period, the controller being further adapted to remove the row select control signal after the transfer to isolate the output line from the readout circuit, pulse the first control signal while at substantially the same time provide a reset control signal to the reset switch and a disable control signal to the enable switch, the disable control signal disabling the enable switch to disconnect the load transistor from the output line, and the reset control signal connecting the hard reset level to the source/drain terminal of the reset switch to perform a hard reset of the pixel when the first control signal is pulsed on and connect the power supply level the source/drain terminal to perform a soft reset of the pixel when the first control signal is pulsed off while the reset control signal is being applied.

9. The imager device of claim 8, wherein the hard reset voltage level is obtained by discharging a power supply capacitance from the first circuit to the source/drain terminal of the reset switch.

10. The imager device of claim 8, wherein the output line is isolated from the readout circuit during an entirety of each period required to perform the hard and soft reset of the pixel.

11. The imager device of claim 8, wherein the soft reset of the pixel achieves a soft reset level that is substantially the same as additional soft reset levels of the pixel regardless of the amount of light impinging on the pixel.

12. The imager device of claim 8, wherein the disabling of the enable switch prevents a parasitic output capacitance from discharging through the load transistor during the hard and soft resets.

13. An imager integrated circuit comprising:

an array of pixels, each pixel being associated with a row and a column in the array, each pixel including a photosensitive element, a source follower transistor coupled to an output of the photosensitive element, a reset switch and a row select switch;

a plurality of readout circuits, each readout circuit being associated with and coupled to a respective column of pixels, each readout circuit including a load transistor associated with source follower transistors in the pixels of the associated column;

means for transferring a first voltage from each pixel in a selected row to the respective readout circuit, each first voltage representing an amount of light impinging on a respective pixel during an integration period;

means for electrically disconnecting the pixels in the selected row from the readout circuits;

means for performing a hard reset of the pixels in the selected row;

means for performing a soft reset of the pixels in the selected row;

means for electrically connecting the pixels in the selected row to the associated readout circuits; and means for transferring a second voltage from the pixels in the selected row to the readout circuit, the second voltage representing a soft reset level for the pixels.

14. The integrated circuit of claim 13, further comprising means for preventing a parasitic output capacitance from discharging through a load transistor of the readout circuits during the hard and soft resets.

15. The integrated circuit of claim 13, wherein the means for electrically disconnecting the pixels comprises means for disabling row select transistors before the hard resets.

16. The integrated circuit of claim 13, wherein the means for performing the hard reset comprises means for discharging a power supply capacitance present at a node coupled to a drain of a pixel reset transistor.

* * * * *